United States Patent
Nakao

(10) Patent No.: US 10,293,406 B2
(45) Date of Patent: May 21, 2019

(54) FLAKY METAL PIGMENT AND METHOD OF MANUFACTURING FLAKY METAL PIGMENT

(71) Applicant: TOYO ALUMINIUM KABUSHIKI KAISHA, Osaka-shi, Osaka (JP)

(72) Inventor: Takayuki Nakao, Osaka (JP)

(73) Assignee: TOYO ALUMINIUM KABUSHIKI KAISHA, Osaka-Shi, Osaka (JP)

( * ) Notice: Subject to any disclaimer, the term of this patent is extended or adjusted under 35 U.S.C. 154(b) by 125 days.

(21) Appl. No.: 15/113,717

(22) PCT Filed: Mar. 24, 2015

(86) PCT No.: PCT/JP2015/058909
§ 371 (c)(1),
(2) Date: Jul. 22, 2016

(87) PCT Pub. No.: WO2015/146977
PCT Pub. Date: Oct. 1, 2015

(65) Prior Publication Data
US 2017/0001242 A1 Jan. 5, 2017

(30) Foreign Application Priority Data
Mar. 28, 2014 (JP) ................................ 2014-068359

(51) Int. Cl.
| | | |
|---|---|---|
| B22F 1/00 | (2006.01) | |
| B22F 9/04 | (2006.01) | |
| B22F 9/08 | (2006.01) | |
| C08K 3/08 | (2006.01) | |
| C09C 1/62 | (2006.01) | |
| C09C 1/64 | (2006.01) | |
| C09D 7/40 | (2018.01) | |
| C09D 101/18 | (2006.01) | |
| C09D 201/00 | (2006.01) | |

(52) U.S. Cl.
CPC ............ *B22F 1/0055* (2013.01); *B22F 9/04* (2013.01); *B22F 9/082* (2013.01); *C09C 1/62* (2013.01); *C09C 1/64* (2013.01); *C09D 7/40* (2018.01); *C09D 7/70* (2018.01); *C09D 101/18* (2013.01); *C09D 201/00* (2013.01); *B22F 2009/043* (2013.01); *B22F 2009/0804* (2013.01); *B22F 2301/052* (2013.01); *B22F 2304/10* (2013.01); *B22F 2998/10* (2013.01); *C08K 3/08* (2013.01); *C08K 2003/0812* (2013.01); *C08K 2201/005* (2013.01)

(58) Field of Classification Search
CPC ............ B22F 1/0055; B22F 2009/044; B22F 2301/052; B22F 2304/10; C09D 7/77; C09C 1/64; C09C 1/62; C08K 2003/0812; C08K 2201/005
See application file for complete search history.

(56) References Cited

U.S. PATENT DOCUMENTS

| | | | | |
|---|---|---|---|---|
| 4,884,754 A * | 12/1989 | Kemp, Jr. | ............... | B22F 9/04 241/5 |
| 5,379,947 A * | 1/1995 | Williams | ........... | C08G 18/6229 241/21 |
| 6,395,332 B1 * | 5/2002 | Hanawa | ................ | B22F 1/0055 427/216 |
| 7,618,475 B2 * | 11/2009 | Yamashina | ........... | B22F 1/0007 252/512 |
| 2003/0055127 A1 | 3/2003 | Chen et al. | | |
| 2006/0179975 A1 | 8/2006 | Yamashina et al. | | |
| 2007/0101822 A1 | 5/2007 | Hattori et al. | | |
| 2009/0098006 A1 | 4/2009 | Nakamura et al. | | |
| 2010/0256284 A1 | 10/2010 | Kagata et al. | | |
| 2011/0008613 A1 | 1/2011 | Takano et al. | | |
| 2011/0250437 A1 | 10/2011 | Funakubo | | |
| 2012/0295076 A1 | 11/2012 | Toyoda et al. | | |
| 2013/0048920 A1 | 2/2013 | Inagaki et al. | | |
| 2013/0058988 A1 | 3/2013 | Winkelmann et al. | | |
| 2015/0252224 A1 * | 9/2015 | Iseda | ....................... | C08K 3/08 428/323 |

FOREIGN PATENT DOCUMENTS

| | | |
|---|---|---|
| CN | 1550261 A | 12/2004 |
| CN | 1986648 A | 6/2007 |
| CN | 102219388 A | 10/2011 |
| CN | 102395634 A | 3/2012 |
| CN | 102838904 A | 12/2012 |
| CN | 102417766 B * | 4/2014 |
| EP | 2239307 A1 | 10/2010 |
| JP | 62-21041 U | 2/1987 |
| JP | 10-337457 A | 12/1998 |
| JP | 2003-26956 A | 1/2003 |

(Continued)

OTHER PUBLICATIONS

Translation for CN 102417766B—Apr. 2, 2014.*
ESPACENET translation for CN 102417766, Apr. 2, 2014.*
Translation of paragraph 17 of CN 102417766, Apr. 2014.*
Extended European Search Report, dated Dec. 22, 2017, for European Application No. 15768703.9.
Taiwanese Office Action and Search Report, dated Jan. 15, 2019, for Taiwanese Application No. 104110099, with an English translation.
Japanese Office Action dated Mar. 5, 2019, for Japanese Application No. 2016-510384, with an English Translation.

*Primary Examiner* — C Melissa Koslow

(74) *Attorney, Agent, or Firm* — Birch, Stewart, Kolasch & Birch, LLP

(57) ABSTRACT

An object of the present invention is to provide a flaky metal pigment that is reduced in particle size. According to the flaky metal pigment of the present invention, in the case where the flaky metal pigment is measured by a flow-type particle image analyzer, P50 showing a 50% cumulative frequency of a diameter equivalent to an area circle in a number distribution is less than 0.500 μm.

8 Claims, 3 Drawing Sheets

(56) References Cited

FOREIGN PATENT DOCUMENTS

| | | |
|---|---|---|
| JP | 2005-200560 A | 7/2005 |
| JP | 2007-126744 A | 5/2007 |
| JP | 2008-32940 A | 2/2008 |
| JP | 2008-174712 A | 7/2008 |
| JP | 2009-13494 A | 1/2009 |
| JP | 2009-144188 A | 7/2009 |
| JP | 2010-135140 A | 6/2010 |
| JP | WO2011/078141 A1 | 6/2011 |
| JP | 2011-132483 A | 7/2011 |
| JP | 2011-219807 A | 11/2011 |
| JP | 2012-255143 A | 12/2012 |
| TW | 200746185 A | 12/2007 |
| WO | WO 2009/130689 A2 | 10/2009 |
| WO | WO 2011/078141 A1 | 6/2011 |
| WO | WO 2013/047385 A1 | 4/2013 |
| WO | WO 2014/050156 * | 3/2014 |

* cited by examiner

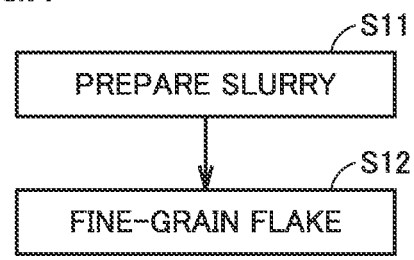
FIG.1
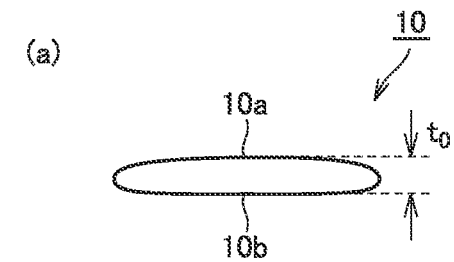
FIG.2
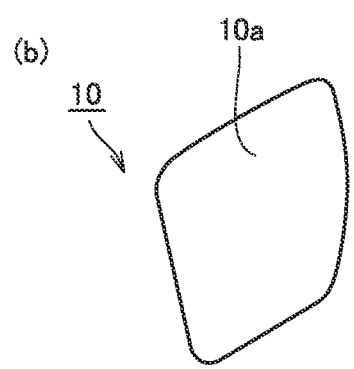

FLAKY METAL PIGMENT AND METHOD OF MANUFACTURING FLAKY METAL PIGMENT

TECHNICAL FIELD

The present invention relates to a flaky metal pigment and a method of manufacturing a flaky metal pigment.

BACKGROUND ART

Conventionally, since flake-shaped metal pigments (which will be hereinafter also referred to as "flaky metal pigments") exhibit an excellent metallic texture when being used to form a coating film, such pigments have been used for paint, ink, and the like. Such flaky metal pigments have been conventionally manufactured by the ball mill method as described below.

First, metal powder as a raw material, an organic solvent, and a grinding aid such as a higher fatty acid are first prepared. Then, these materials are introduced into a cylindrical drum, into which media (balls) are introduced. Then, the drum is rotated to apply mechanical force to the metal powder within the drum, thereby allowing flaking of the metal powder.

Such a ball mill method is suitable to manufacture powder having an average particle diameter of 10 μm or more and the maximum particle diameter of more than 20 μm. Thus, the manufactured powder is widely utilized in coating techniques such as spray coating and screen printing.

In recent years, a coating technique implemented by ink jetting has been started to be employed in place of the coating technique as described above. Accordingly, there has been an increased demand for metallic printing by which a metallic image and the like are printed using this coating technique. However, when flaky metal pigments produced by the conventional ball mill method are used in ink jetting for the purpose of conducting metallic printing, the following problem occurs.

In ink jetting, ink is discharged at high speed from an ink-jet nozzle and the discharged ink is coated on a base body such as a paper medium to form a coating film. Thus, an image is formed by arrangement of this coating film. However, a flaky metal pigment is not small enough for the diameter of the hole of the ink-jet nozzle used in an industrially-applied or non-commercially-applied general ink jetting process, which causes blockage in the ink-jet nozzle, with the result that ink cannot be discharged.

In order to solve the above-described problems, an attempt has been made to produce flaky metal pigments reduced in particle diameter, thereby allowing metallic printing implemented by ink jetting. For example, Japanese Patent Laying-Open No. 2008-174712 (Cited Document 1) discloses a method of forming an aluminum vapor deposition layer by the vacuum vapor deposition method, which is subjected to an ultrasonic treatment in a solvent so as to be peeled, fine-grained and distributed, thereby producing an aluminum pigment having a particle size smaller than that in the conventional case.

CITATION LIST

Patent Document

PTD 1: Japanese Patent Laying-Open No. 2008-174712

SUMMARY OF INVENTION

Technical Problem

However, according to recent improvements in ink-jet printing technique, formation of an image with extremely high definition has been increasingly required. Forming an image with high definition requires pigments further reduced in particle size. The same applies also to metallic printing implemented by ink jetting. Accordingly, metal pigments further reduced in particle size need to be provided.

The present invention has been made in light of the above-described circumstances. An object of the present invention is to provide a flaky metal pigment reduced in particle size and a method of manufacturing a flaky metal pigment, both of which can be utilized for metallic printing implemented by ink jetting.

Solution to Problem

In order to solve the above-described problems, the present inventor has conducted earnest studies for manufacturing a metal pigment that is fine-grained in particle diameter, which can be suitably utilized for metallic printing implemented by ink jetting. The studies showed that the method as disclosed in PTD 1 requires an extremely long processing time to achieve a fine-grained aluminum pigment, and also that it is difficult to fine-grain a metal pigment to a required degree.

Accordingly, the present inventor considered that pigment needs to be fine-grained by the technique different from the conventional techniques. Thus, upon conducting further studies, the inventor has found that a flake having a surface that is sufficiently large for its thickness is produced and jetted at high-pressure, thereby applying external force to this flake, so that this flake can be remarkably fine-grained. The present invention has been completed based on this finding.

Specifically, a flaky metal pigment according to one embodiment of the present invention is characterized in that, in a case where the flaky metal pigment is measured by a flow-type particle image analyzer, P50 showing a 50% cumulative frequency of a diameter equivalent to an area circle in a number distribution is less than 0.500 μm.

In the above-described flaky metal pigment, preferably, in the case where the flaky metal pigment is measured by the flow-type particle image analyzer, Pmax showing a maximum particle diameter of the diameter equivalent to an area circle in the number distribution is 5.000 μm or less.

In the above-described flaky metal pigment, preferably, P50/t showing a ratio of an average thickness t of each flaky metal pigment to P50 is 1 or more and 100 or less.

In the above-described flaky metal pigment, preferably, the flaky metal pigment is made of aluminum.

A method of manufacturing a flaky metal pigment according to one embodiment of the present invention includes the steps of: preparing slurry including a flake made of metal; and fine-graining the flake by jetting the slurry at high pressure.

In the above-described method of manufacturing a flaky metal pigment, preferably, the fine-graining step includes the steps of: jetting the slurry from a jetting unit into a reaction chamber at a pressure of 70 MPa or more; and causing the flake included in the jetted slurry to collide with a hard body disposed within the reaction chamber.

In the above-described method of manufacturing a flaky metal pigment, preferably, the fine-graining step includes the steps of: jetting the slurry from a jetting unit into a reaction chamber at a pressure of 70 MPa or more; and causing the slurries jetted from the jetting units to collide with each other to cause the flakes included in the slurries to collide with each other. In addition, it is preferable that two or more jetting units are provided. In this case, the slurry is jetted from each of the jetting units, and flakes included in the jetted slurries collide with each other, so that the flakes each can be fine-grained efficiently.

In the above-described method of manufacturing a flaky metal pigment, preferably, the flake is made of aluminum obtained by a vacuum vapor deposition method.

Advantageous Effects of Invention

According to the above description, it becomes possible to provide a flaky metal pigment that is reduced in particle size and a method of manufacturing a flaky metal pigment, both of which can be utilized for metallic printing implemented by ink jetting.

BRIEF DESCRIPTION OF DRAWINGS

FIG. 1 is a flow diagram showing an example of a method of manufacturing a flaky metal pigment according to an embodiment.

FIG. 2 is a schematic diagram for illustrating the shape of a flake included in slurry to be prepared, in accordance with the method of manufacturing a flaky metal pigment according to the embodiment.

DESCRIPTION OF EMBODIMENTS

Figure 3:
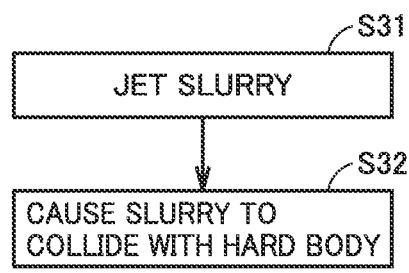
FIG. 3 is a flow diagram for illustrating an example of the fine-graining step.

Hereinafter described will be embodiments of a flaky metal pigment of the present invention, a metallic composition containing the same and a coated product, and a method of manufacturing the flaky metal pigment.

First Embodiment: Flaky Metal Pigment

As to a flaky metal pigment according to the first embodiment, P50 showing a 50% cumulative frequency of a diameter equivalent to an area circle in a number distribution measured by a flow-type particle image analyzer is less than 0.500 μm. The "diameter equivalent to an area circle" is a diameter of a circle equivalent to a projected area of a particle image that has been taken. "P50" represents a particle size at which the cumulative frequency reaches 50% in the cumulative distribution of the diameter equivalent to an area circle in the number distribution. It is to be noted that the "particle size" means the above-mentioned "diameter equivalent to an area circle" unless specifically explained in the specification of the present application.

The above-described flaky metal pigment is made of metal. It is preferable that metal exhibits an excellent metallic texture in image formation, and can be aluminum, copper, iron, stainless steel, and nickel, for example. Particularly, aluminum is preferable since it can exhibit an excellent metallic texture and also in terms of the manufacturing cost. In addition, the term "metallic texture" used in the present specification means a texture that shows a color tone with high luminance like a glittering metallic luster and can be visually recognized.

The above-described aluminum is as a matter of course made of metal aluminum, and may be made of an aluminum alloy or a mixture thereof. An aluminum alloy can be an alloy and the like made of Al that is main metal and at least one or more types selected from silicon (Si), magnesium (Mg) and transition metal. It is preferable that the flaky metal pigment is made of Al since it can be industrially manufactured at low cost and exhibits a relatively high metallic texture.

Furthermore, examples of the flow-type particle image analyzer can be "FPIA-2100", "FPIA-3000", and "FPIA-3000S" (trade names) manufactured by Sysmex Corporation. Furthermore, in the present specification, "P50" measured by the flow-type particle image analyzer means a value measured on the following measurement conditions. Furthermore, "Pmax" and "P10", which will be described later, also mean the values measured on the same measurement conditions.

Image pick-up unit: high-magnification image pick-up unit

Magnification: 40 times (20-times ocular lens×2-times object lens)

Measurement mode: HPF measurement mode

Measurement time: about 2 minutes

Measurement solvent: ethanol

Binarized threshold value setting coefficient: 85%

Dilution ratio by solvent during measurement: 2000 times

Sheath liquid: ethanol.

The flaky metal pigment having P50 of less than 0.500 μm tends to be smaller in particle size and sharper in particle size distribution than a flaky metal pigment manufactured by the conventional ball mill method and an aluminum pigment manufactured by the manufacturing method disclosed in PTD 1. Such a flaky metal pigment according to the first embodiment can be suitably used for an application that requires a flaky metal pigment reduced in particle size, for example, for high-definition ink jetting. In the case where the flaky metal pigment according to the first embodiment is used for metallic printing implemented by ink jetting, the following effects can be achieved.

Specifically, since the conventional flaky metal pigment has a relatively large particle size, the total number of metal pigments in the coating film coated by ink jetting on a base body (a paper medium and the like) tended to be less than the desired number. Furthermore, the conventional flaky metal pigment has a relatively large particle size, which causes a problem that an ink-jet nozzle for discharging a metallic composition gets clogged by repeated discharge of the composition.

In contrast, a flaky metal pigment according to the first embodiment tends to be smaller in particle size and more uniform in particle size than the conventional flaky metal pigment. Accordingly, the total number of metal pigments in the metallic composition coated by ink jetting on a base body (a paper medium and the like) can be increased. Therefore, in the case where the flaky metal pigment according to the first embodiment is used, the coating film (image) formed on a base body can exhibit high shielding performance. Also, the number of times of repeated coating can be reduced, and further, clogging of the ink-jet nozzle can be suppressed. Furthermore, in the case where the shielding performance comparable to that of the metallic composition made using conventional flaky metal pigments only has to be achieved, it is also expected that the content of the flaky metal pigments in the metallic composition can be reduced, which leads to reduction in manufacturing cost.

In such a flaky metal pigment according to the first embodiment, Pmax showing the value of the maximum particle diameter of the diameter equivalent to an area circle in the number distribution measured by a flow-type particle image analyzer is preferably 5 µm or less, and more preferably 3 µm or less. The Pmax having a value of 5 µm or less allows further higher shielding performance. Also, since the particle size distribution becomes sharp, clogging of the ink-jet nozzle used for ink jetting is further suppressed, thereby allowing formation of an image with high definition.

Furthermore, in the flaky metal pigment according to the first embodiment, average thickness t is preferably 5 nm or more and 25 nm or less, and more preferably 10 nm or more and 25 nm or less.

In this case, average thickness t can be measured as described below. Specifically, several drops of flaky metal pigments diluted with acetone are dripped onto a glass substrate, and then, naturally dried and hardened. Then, an atomic force microscope (trade name: "Nanopics 1000" manufactured by Seiko Instruments Inc.) is used to extract 20 points of flaky metal pigments forcibly oriented on the glass substrate and measure each thickness in a tapping mode. Then, the average value of thicknesses at remaining 14 points among the thicknesses measured at 20 points except for thicknesses having higher values at three points and lower values at three points is calculated. This calculated average value is defined as an average thickness t.

When average thickness t is less than 5 nm, most of light transmits through the flaky metal pigment, which may cause deterioration in metallic texture, deterioration in shielding performance, and the like. Furthermore, in the case where flaky metal pigments of average thickness t of less than 5 nm are used for the metallic composition for ink jetting, it is necessary to significantly increase the content of the flaky metal pigments in the ink composition for sufficiently exhibiting a metallic texture. This may result in clogging of the ink-jet nozzle.

On the other hand, when average thickness t exceeds 25 nm, the particle size distribution of the flaky metal pigments tends to be broad in the manufacturing process described later, with the result that the brightness may decrease and the metallic texture may also deteriorate. Furthermore, in the case where the metallic composition including such flaky metal pigments is coated on a base body, irregular reflection of light resulting from overlapping of the flaky metal pigments on the base body becomes remarkable, and thus, an excellent metallic texture is less likely to be achieved.

Furthermore, it is preferable that the flaky metal pigment according to the first embodiment has a uniform thickness. This allows formation of a coating film having a homogeneous metallic texture. Furthermore, the flaky metal pigment has two surfaces that face each other so as to extend approximately in its thickness direction. It is preferable that these surfaces are flat. Also in this case, a coating film having a more homogeneous metallic texture can be formed.

Furthermore, in the flaky metal pigment according to the first embodiment, P50/t showing a ratio of average thickness t to P50 (in which case the unit of P50 and the unit of t are the same) is preferably 1 or more and 100 or less, more preferably 3 or more and 100 or less, and further more preferably 10 or more and 50 or less.

In the case where the aspect ratio expressed by P50/t is less than 1, the thickness tends to be large relative to the particle size of the flaky metal pigment. Accordingly, when the metallic composition containing such pigments is coated on a base body, irregular refraction of light resulting from overlapping of the flaky metal pigments on the base body becomes remarkable, so that an excellent metallic texture is less likely to be achieved.

On the other hand, in the case where the aspect ratio expressed by P50/t exceeds 100, the thickness of the flaky metal pigment tends to be extremely thin. Accordingly, light transmits through the flaky metal pigment, which may cause deterioration in the shielding performance and the like.

Furthermore, in the flaky metal pigment according to the first embodiment, Pmax/P10 showing a ratio of P10 to Pmax (in which case the unit of Pmax and the unit of P10 are the same) is preferably 1 or more and 18 or less, and more preferably 2 or more and 15 or less, wherein P10 is a value of the 10% cumulative frequency in the number distribution of the flaky metal pigments measured by the flow-type particle image analyzer.

In the case where Pmax/P10 is 1 or more and 18 or less, the particle size distribution of the flaky metal pigments is sharp. Accordingly, in the case where such flaky metal pigments are used for a metallic composition for ink jetting, clogging of the ink-jet nozzle is further suppressed while an image with high definition can be formed. Furthermore, the formed image can exhibit an excellent metallic texture.

Second Embodiment: Metallic Composition

The metallic composition according to the second embodiment is a metallic composition including a flaky metal pigment according to the above-described first embodiment.

The usage of the metallic composition according to the second embodiment is not particularly limited, but for example, can be used for paint, ink, a resin molded product, cosmetic materials, wiring of an electronic circuit component, and the like for which a metallic texture and a high degree of definition are required. The metallic composition according to the second embodiment includes a flaky metal pigment that tends to be smaller in particle size than the conventional pigment. Accordingly, for example, in the case where the metallic composition according to the second embodiment is used as ink for ink jetting, an excellent metallic texture can be achieved while a coating film (image) having excellent shielding performance can be formed even if the discharge amount or the number of times of repeated coating is less than that in the conventional case. Furthermore, the metallic composition according to the second embodiment can suppress clogging of the ink-jet nozzle.

In addition to the above-described flaky metal pigment, the metallic composition according to the second embodiment can include optional elements, for example, a resin, a solvent, a color pigment (for example, an inorganic pigment, an organic pigment, and the like), and the like. Furthermore, it may also include: dispersants such as a surfactant: or stabilizing agents such as an antioxidant and an ultraviolet absorber.

As the above-described resin, a combination of two or more of the following elements is suitably used, which include an epoxy resin, a polyester resin, an acrylic resin, an acrylic silicone resin, a vinyl resin, a silicon resin, a polyamide resin, a polyamideimide resin, a fluorine resin, boiled oil, chlorinated rubber, an amino resin, a phenol resin, a polyisocyanate resin, a urea resin, and the like.

Examples of the above-described solvent can be an alcohol-based, a glycol-based, a ketone-based, an ester-based, an ether-based, an aromatic-based, or a hydrocarbon-based organic solvent, water, and the like. In the case where water is used and also the case where the above-described flaky metal pigment contains aluminum or is made of aluminum, it is preferable that the surface of the flaky metal pigment is coated with an optional coating film in order to suppress the reaction between water and aluminum. Such a coating film can be a coating film, for example, made of metal oxide, resin, and the like.

In the metallic composition according to the second embodiment, the amount of flaky metal pigments blended in the metallic composition is not particularly limited. The blending amount varies depending on applications, and generally, preferably falls within a range of 0.1 mass % or more and 80 mass % or less. Particularly, in order to suitably use the metallic composition according to the second embodiment as a metallic composition for ink jetting, the blending amount is preferably 0.1 mass % or more and 30 mass % or less, more preferably 0.5 mass % or more and 20 mass % or less, and further more preferably 0.5 mass % or more and 10 mass % or less. In the case where the amount of flaky metal pigments blended in the metallic composition for ink jetting exceeds 30 mass %, the metallic composition cannot be kept in a slurry state but turns into a paste state, and therefore, tends to be difficult to be discharged through the ink-jet nozzle. Furthermore, in the case where the blending amount is less than 0.5 mass %, formation of an image having a sufficient concentration tends to be difficult.

In addition, as an ink-jet discharging method using the metallic composition according to the second embodiment, various methods can be employed, which can for example be a drop-on-demand method (or a pressure pulse method) by which ink (a metallic composition) is discharged utilizing electrostatic attraction force; a bubble method (or a thermal jet method) by which ink (a metallic composition) is discharged utilizing pressure produced by growth of air bubbles formed by high temperature; and the like.

Furthermore, in the case where the metallic composition according to the second embodiment is coated on a base body, the material of the base body to be coated is not particularly limited, and can be inorganic substances such as metal, ceramics and glass, a synthetic resin, paper, various types of electronic substrates, and the like. Particularly in the case where the metallic composition according to the second embodiment is used for ink jetting, examples of the base body can be papers including non-coated printing paper, coated printing paper such as coated paper and glossy paper; substrates made of a synthetic resin film, a synthetic resin molded body, glass, metal, wiring, and the like; and fibers such as clothing.

The metallic composition having been specifically described above can be manufactured by a known manufacturing method. For example, after the flaky metal pigments according to the first embodiment, a dispersant, and a solvent are mixed, the obtained dispersion liquid is prepared using a stirrer, a ball mill, a bead mill, an ultrasonic wave, a jet mill, or the like. Then, a surfactant, resin, and other additives are added to the prepared dispersion liquid while being stirred, so that a metallic composition can be manufactured.

Third Embodiment: Coated Product

The coated product according to the third embodiment is obtained by applying a metallic composition according to the second embodiment. It is to be noted that the coated product means a product obtained by applying a metallic composition onto an object to be coated by means of coating or the like.

In the coated product according to the third embodiment, the flaky metal pigment that tends to be smaller in particle size than the conventional pigment is applied. Accordingly, the coated product exhibits an excellent metallic texture, and also, the object to be coated is sufficiently shielded by the flaky metal pigments.

The thickness of the coating film applied on the coated product according to the third embodiment is not particularly limited, but another underlying layer may be provided under this coating film, and another coat layer may also be provided on this coating film. In addition, since an explanation of the object to be coated according to the third embodiment is the same as that of the base body described in the second embodiment, the description thereof will not be repeated.

Fourth Embodiment: Method of Manufacturing Flaky Metal Pigment

The method of manufacturing a flaky metal pigment according to the fourth embodiment is a method of manufacturing a flaky metal pigment, and particularly suitable for manufacturing the flaky metal pigment according to the first embodiment. Specifically, referring to FIG. 1, the method includes the steps of: preparing slurry including a flake made of metal (a slurry preparing step: step S11); and fine-graining the flake by jetting the slurry at high pressure (fine-graining step: step S12). Referring to FIGS. 1 to 6, an example of the method of manufacturing a flaky metal pigment made of aluminum will be hereinafter described in detail.

<Slurry Preparing Step>

Referring to FIG. 1, in the manufacturing method according to the fourth embodiment, slurry including flakes each made of aluminum is first prepared (step S11). The prepared slurry includes aluminum flakes made of aluminum and a solvent.

FIG. 2(a) shows a schematic side view illustrating an example of the shape of a flake made of aluminum (which will be hereinafter referred to as an "Al flake"). FIG. 2(b) shows a schematic plan view illustrating an example of the shape of the Al flake. Referring to FIG. 2(a), Al flake 10 has a thickness $t_0$ that is preferably 5 nm or more and 25 nm or less, and more preferably 10 nm or more and 25 nm or less.

In this case, average thickness t of the flaky metal pigments to be manufactured is readily adjusted to be 5 nm or more and 25 nm or less. Furthermore, in the fine-graining step described later, Al flake 10 can be fine-grained efficiently. Furthermore, in the case where average thickness t exceeds 25 nm, the mechanical strength of the prepared Al flake 10 is increased, thereby lengthening the time of the fine-graining step, so that the productivity tends to significantly deteriorate.

Furthermore, particle size D50 of Al flake 10 is not particularly limited, but is preferably 1 μm or more and 50 μm or less. In the case where particle size D50 of Al flake 10 is 50 μm or less, in the fine-graining step described later, clogging of the nozzle for fine-graining can be suppressed while fine-graining can be achieved efficiently in a short period of time. Furthermore, it is substantially difficult to industrially obtain Al flake 10 having particle size D50 of less than 1 μm. It is to be noted that particle size D50 means a particle size having a cumulative degree of 50% in the volume cumulative particle size distribution measured by laser diffractometry.

Al flake 10 as described above can be manufactured by the ball mill method, the vacuum vapor deposition method, and the like. In the fourth embodiment, it is preferable that a flake manufactured by the vacuum vapor deposition method is used as Al flake 10. This is because Al flake 10 manufactured by the vacuum vapor deposition method can have smooth and flat surfaces 10a and 10b while having thickness $t_0$ that is relatively more uniform and thinner than that obtained by the ball mill method.

An example of the vacuum vapor deposition method will be hereinafter described. First, a sheet-like base member, or a sheet-like base member having a surface on which a peeling resin layer is formed is prepared. The sheet-like base member to be used can for example be a film made of PET (polyethylene terephthalate) and the like. As a peeling resin layer, a coating film made of polyvinyl alcohol or the like can be used.

Then, a vapor deposition layer made of aluminum is formed by the vacuum vapor deposition method on the surface of the sheet-like base member (or if a peeling resin layer is formed, on the surface of this peeling resin layer). In the case where a peeling resin layer is used, peeling resin layers and vapor deposition layers are alternately stacked multiple times to provide a multi-layer structure. This vapor deposition layer is formed to have a thickness of 5 nm or more and 25 nm or less, so that thickness $t_0$ of Al flake 10 can be readily adjusted to be 5 nm or more and 25 nm or less. In addition, it is substantially difficult to form an aluminum layer having a thickness of less than 5 nm as a uniform continuous layer on the sheet-like base member or on the peeling resin layer on the surface of the sheet-like base member.

Then, an aluminum vapor deposition layer is peeled at the surface of the sheet-like base member (or if a peeling resin layer is formed, at the surface of the peeling resin layer) defined as a boundary. This peeled aluminum vapor deposition layer is pulverized to obtain Al flakes 10. In addition, the peeled aluminum vapor deposition layer is subjected to an ultrasonic treatment as required, so that particle size D50 of Al flake 10 may be reduced to some extent. Thereby, the time required for the fine-graining step described later can be shortened.

The method of peeling an aluminum vapor deposition layer includes a method of peeling an aluminum vapor deposition layer for example by immersing a sheet-like base member, which has an aluminum vapor deposition layer formed thereon, in a solvent in which the sheet-like base member or the peeling resin layer is to be dissolved. In general, a method of dissolving the peeling resin layer to peel the aluminum vapor deposition layer from the sheet-like base member is employed. In this case, the peeled aluminum vapor deposition layer is present in a solvent. Accordingly, for example, by subjecting this solvent to an ultrasonic treatment, the peeled aluminum vapor deposition layer can be pulverized.

Furthermore, another method of peeling the aluminum vapor deposition layer includes, for example, a method of physically peeling the aluminum vapor deposition layer from the sheet-like base member or the peeling resin layer. In this case, the peeled aluminum vapor deposition layer is crushed by a crusher or the like, so that this peeled aluminum vapor deposition layer can be pulverized.

Furthermore, a commercially available PVD pigment may be used as Al flake 10. The PVD pigment generally means a flake made of metal manufactured using the vacuum vapor deposition method as described above.

In addition, even if pulverization is carried out for an excessively long period of time by a ultrasonic treatment or the like without considering the industrial productivity, it is difficult to set P50 to be less than 0.500 μm for the particle size as in the case of the flaky metal pigment of the present invention, and its particle size distribution becomes extremely broad.

A solvent included in the slurry can be any of water, a hydrophilic organic solvent and a hydrophobic organic solvent. Since water is more likely to react with aluminum, it is preferable to use an organic solvent when the flaky metal pigment is made of aluminum. Examples of the hydrophilic organic solvent includes glycol-based solvents such as ethylene glycol, methyl ethyl diglycol, ethylene glycol monobutyl ether (butyl cellosolve), diethylene glycol monobutyl ether, triethylene glycol monoethyl ether, propylene glycol monomethyl ether, propylene glycol monoethyl ether, propylene glycol monopropyl ether, dipropylene glycol monomethyl ether, dipropylene glycol monoethyl ether; glycol acetate-based solvents such as propylene glycol monomethyl ether acetate and ethyl diglycol acetate; alcohol-based solvents such as isopropyl alcohol; and the like. Examples of the hydrophobic organic solvent include aliphatic hydrocarbons such as mineral spirit, isoparaffin, normal paraffin, and petroleum benzene; and aromatic hydrocarbons such as xylene, toluene, and solvent naphtha.

The solid content (that is, the content ratio of Al flakes 10) in the slurry is not particularly limited, but only has to be able to be jetted in the fine-graining step described later. For example, the content of Al flakes 10 to the total weight of the slurry is preferably 1 mass % or more and 30 mass % or less, more preferably 1 mass % or more and 20 mass % or less, and further more preferably 1 mass % or more and 10 mass % or less. When the content exceeds 30 mass %, the slurry cannot be kept in its state and turns into paste, which tends to be difficult to be jetted from the nozzle for fine-graining. Furthermore, in the case where the content is less than 1 mass %, the efficiency of the fine-graining step may decrease.

In the case where the obtained Al flakes 10 are present in the solvent, if the mixture of Al flakes 10 and the solvent is in the slurry state, this mixture can be used as it is in the fine-graining step described later. Furthermore, in the case where the solid content in the mixture is relatively high and the mixture is in a paste state, a solvent is further added to this mixture to adjust the solid content in the mixture to fall within an appropriate range (viscosity), so that the obtained mixture can be used in the fine-graining step described later. In this case, it is preferable that a solvent described later is used as a solvent used for peeling the aluminum vapor deposition layer. In addition, a commercially available Al flake is often in a slurry state.

On the other hand, in the case where the obtained Al flakes 10 are present as powder, a solvent is added to Al flakes 10 to adjust the solid content in the mixture to fall within an appropriate range, so that the obtained mixture can be used in the fine-graining step described later.

<Fine-Graining Step>

Referring to FIG. 1, after the above-described slurry preparing step, the prepared slurry is jetted at high pressure to fine-grain Al flake 10 (step S12). Thereby, surface 10a and surface 10b of Al flake 10 are separated and fine-grained. Consequently, it becomes possible to manufacture a flaky metal pigment in which P50 showing a 50% cumulative frequency of the diameter equivalent to an area circle in the number distribution is less than 0.500 µm.

The method of fine-graining an Al flake by jetting at high pressure is to apply pressure to slurry to be jetted at high speed and apply physical force to Al flake 10 included in the jetted slurry so as to be crushed. When comparing the flaky metal pigment that is fine-grained in the present step and the Al flake prepared in the slurry preparing step, the thicknesses of the pigment and the flake are relatively similar to each other, whereas the particle sizes thereof are to be greatly different from each other. A method of fine-graining a Al flake by jetting slurry at high pressure can be methods (1) to (4) as described below.

(1) The slurry accelerated by pressurization is caused to collide with a hard body to cause the Al flake included in the slurry to collide with the hard body, thereby fine-graining the Al flake.

(2) As disclosed in U.S. Pat. No. 3,151,706 (Japanese Patent Laying-Open No. 10-337457), the slurries accelerated by pressurization are caused to collide with each other to cause the Al flakes included in the slurries to collide with each other, thereby fine-graining each Al flake.

(3) By using a combination of the above-described methods (1) and (2), the accelerated slurries are caused to collide with each other and also to collide with a hard body, thereby fine-graining each Al flake.

(4) Slurry is accelerated by pressurization to cause cavitation to occur in the slurry (a phenomenon in which a low pressure portion in the raw material flowing at high speed in the pressurized state is vaporized to produce pockets of vapor in an extremely short period of time, and the produced pockets of vapor collapse and disappear in an extremely short period of time), and then, each Al flake is fine-grained by the impact caused by production and disappearance of air bubbles within the slurry.

In the fourth embodiment, it is preferable to use the above-described method (1) or (2) since it allows highly efficient fine-graining and also allows production of a flaky metal pigment having a desired particle size in a short period of time. Particularly, the above-described method (1) is further preferable since it is more efficient in fine-graining than the above-described method (2). The above-described method (1) will be hereinafter specifically described with reference to FIGS. 3 and 4, and the above-described method (2) will be hereinafter specifically described with reference to FIGS. 5 and 6.

The above-described method (1) will be first described.

Figure 4:
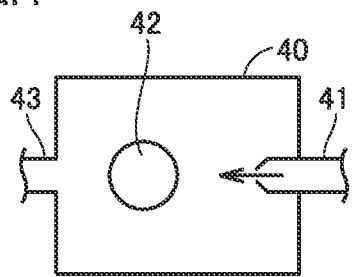
FIG. 4 is a schematic diagram for illustrating an example of the fine-graining step.

Referring to FIGS. 3 and 4, first, in step S31, slurry is jetted from a nozzle 41 as a jetting unit into a reaction chamber 40 at a pressure of 70 MPa or more (jetting step). It is to be noted that the arrow in the figure shows a direction in which the slurry is jetted. Then, in step S32, Al flakes 10 included in the jetted slurry are caused to collide with a hard body 42 disposed within reaction chamber 40 (collision step). Thereby, each Al flake 10 is fine-grained. The slurry having been fine-grained is removed through a discharge unit 43 to the outside of reaction chamber 40.

The pressure applied to the slurry while being jetting from nozzle 41 is preferably 70 MPa or more and 250 MPa or less, and more preferably 100 MPa or more and 250 MPa or less. The present inventor confirmed that Al flake 10 can be fine-grained efficiently under such pressure conditions.

Furthermore, although the diameter of the discharge port of nozzle 41 is not particularly limited, it is preferably 0.1 mm or more and 0.5 mm or less, more preferably 0.1 mm or more and 0.30 mm or less, and further more preferably 0.1 mm or more and 0.15 mm or less. In this case, slurry can be jetted at high speed and clogging of nozzle 41 can also be sufficiently suppressed.

The quality of the material of hard body 42 is not particularly limited, but only has to be higher in hardness than Al flake 10. Examples of such material can be ceramics such as SiN.

Furthermore, the flow rate of slurry is preferably 10 L/hour or more and 200 L/hour or less, and more preferably 40 L/hour or more and 150 L/hour or less. The present inventor confirmed that Al flake 10 can be fine-grained efficiently at such a flow rate.

Furthermore, the slurry jetted into reaction chamber 40 can be caused to flow from a reflux port (not shown) back into nozzle 41 and jetted again. Accordingly, when the present step is performed using a prescribed amount of slurry, the jetting time is set so as to be relatively long to cause the slurry to reflux, so that the slurry can be repeatedly caused to collide with hard body 42. The total amount of the slurry provided in the present step is not particularly limited. In the case where the total amount is 50 g or more and 500 g or less, this jetting time (processing time) is preferably 0.05 hours or more and 50 hours or less, and more preferably 1 hour or more and 20 hours or less. In this case, the balance between fine-graining and the processing time is excellent.

Furthermore, in the present step, the temperature of the slurry is preferably 5° C. or more and 250° C. or less, and more preferably 5° C. or more and 150° C. or less, the reason of which will be described below. Specifically, the temperature of slurry tends to rise by jetting the slurry at high pressure. It is feared that the temperature of the slurry may reach the boiling point of the solvent, the spontaneous ignition temperature or the like if it excessively rises. In contrast, this temperature is controlled to be set at at least 250° C. or less, thereby allowing a wide range of selections of solvents to be made, so that evaporation, ignition and the like of the solvent can be suppressed. Furthermore, since the solvent can exist stably during the present step, the stability of the fine-graining process is improved.

The above-described method (2) will be hereinafter described.

Figure 5:
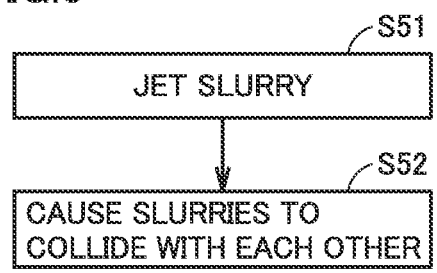
FIG. 5 is a flow diagram for illustrating another example of the fine-graining step.
Figure 6:
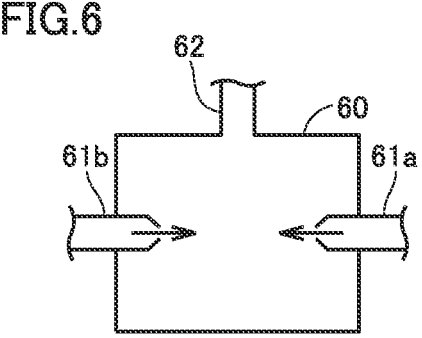
FIG. 6 is a schematic diagram for illustrating another example of the fine-graining step.

Referring to FIGS. 5 and 6, first, in step S51, the slurry is jetted from two nozzles 61a and 61b as jetting units into a reaction chamber 60 under a pressure of 70 MPa or more (jetting step). Although the number of nozzles is two in FIG. 6, the above-described method (2) is not limited thereto. The arrows in the figure show directions in which each slurry is jetted. Then, in step S52, the slurry jetted from nozzle 61a and the slurry jetted from 61b are caused to collide with each other, thereby causing the Al flakes included in these slurries to collide with each other (collision step). Thereby, each Al flake 10 is fine-grained. The slurry having been fine-grained is removed through discharge unit 62 to the outside of reaction chamber 60.

In the above-described method (2), the preferable ranges for other conditions such as pressure are the same as those in the above-described method (1), and therefore, the description thereof will not be repeated.

Although the above-described methods (1) and (2) have been specifically described, examples of an apparatus capable of performing the fine-graining step by means of high-pressure jetting as described above can be "Genus PY" manufactured by Genus, Inc., "Star Burst" manufactured by Sugino Machine Limited, "Nanomizer" manufactured by NANOMIZER Inc., and the like. Particularly, by selecting various configurations of reaction chambers used in the jetting step, "Star Burst" can be suitably utilized in the above-described methods (1), (2), and (4); "Genus PY" can be suitably utilized in the above-described method (3); and "Nanomizer" can be suitably utilized in the above-described method (4).

In the method of manufacturing a flaky metal pigment according to the fourth embodiment as specifically described above, the slurry preparing step and the fine-graining step are performed, thereby allowing production of a flaky metal pigment in which P50 showing a 50% cumulative frequency of the diameter equivalent to an area circle in the number distribution is less than 0.500 µm. The flaky metal pigment having such a particle size could not be manufactured by the conventional manufacturing method.

Furthermore, Pmax for the flaky metal pigment manufactured by the method of manufacturing a flaky metal pigment according to the fourth embodiment can also be set at 5.000 µm or less. Furthermore, Pmax/P10 for the flaky metal pigment (in which case the unit of Pmax and the unit of P10 are the same) can be set at 1 or more and 18 or less. Consequently, the obtained flaky metal pigments tend to be sharper in particle size distribution than those manufactured by the conventional manufacturing method. Accordingly, such flaky metal pigments can be suitably used for metallic printing by ink jetting, which requires high definition.

EXAMPLES

Although the present invention will be hereinafter described in greater detail with reference to Examples, the present invention is not limited thereto.

Example 1

As a flaky metal pigment, a flaky aluminum pigment according to Example 1 was produced as described below.

First, a commercially available PVD pigment was prepared. The characteristics of this PVD pigment were as described below.

Thickness of Al flake: 0.02 µm
Particle size of Al flake (D50): 9 µm
Solid content in slurry: 10 mass %
Solvent included in slurry: Propylene glycol monomethyl ether acetate (which will be hereinafter abbreviated as "PMA").

By two-fold dilution of the above-described PVD pigments with PMA, 2000 g of slurry made of PMA and Al flakes and having a solid content of 5 mass % was prepared (slurry preparing step).

Then, the trade name "Star Burst Labo" manufactured by Sugino Machine Limited was used to jet the prepared slurry at high pressure, so that each Al flake is fine-grained by the above-described method (1) (a method of causing the slurry accelerated by pressurization to collide with a hard body to thereby cause the Al flakes included in the slurry to collide with the hard body, so that each Al flake is fine-grained) (fine-graining step). The conditions in the fine-graining step were as described below.

Pressure applied to slurry: 200 MPa
Diameter of discharge port of nozzle: 0.2 mm
Material of hard body: SiN
Flow rate of slurry: 60 L/hour
Jetting time: 4 hours
Motor capacitance: 7.5 kW.

After the above-described fine-graining step, a slurried sample A including the fine-grained flaky metal pigments according to the present invention was removed from the "Star Burst Labo". The removed sample A, which was slurry made of PMA and flaky aluminum pigments, had a solid content of 5 mass %.

Comparative Example 1

After preparing the slurry by the same method as that in Example 1, an ultrasonic homogenizer (trade name: "MODEL US-300T" manufactured by NIHONSEIKI KAISHA LTD.) was used to perform an ultrasonic treatment in place of the above-described fine-graining step. The amount of slurry used in the treatment was 350 g, which was preparatively separated in a 500-ml PP cup. In addition, since the ultrasonic pulverization causes heat generation, the slurry was pulverized while being continuously immersed in a bath containing ice water. The conditions of the ultrasonic treatment were as described below.

Used chip: standard chip (26ϕ)
V-LEVEL: 400 µA
Treatment time: 5 hours.

A sample B obtained after the above-described ultrasonic treatment was slurry made of PMA and flaky aluminum pigments, and had a solid content of 5 mass %.

<Analysis by Flow-Type Particle Image Analyzer>

Sample A obtained in Example 1 and sample B obtained in Comparative Example 1 each were subjected to a flow-type particle image analyzer, to measure P50, Pmax, and P10. In addition, "FPIA-3000S" manufactured by Sysmex Corporation was used as a flow-type particle image analyzer under the measurement conditions as described above.

<Average Thickness of Flaky Metal Pigments>

Average thickness t of flaky metal pigments (flaky aluminum pigments) included in each of sample A and sample B was calculated according to the above-described method using an atomic force microscope (trade name: "Nanopics 1000" manufactured by Seiko Instruments Inc).

TABLE 1

| | P50 (µm) | Pmax (µm) | P10 (µm) | t (µm) | P50/t | Pmax/P10 |
|---|---|---|---|---|---|---|
| Example 1 | 0.474 | 3.359 | 0.307 | 0.0187 | 25.3 | 10.9 |
| Comparative Example 1 | 1.012 | 9.629 | 0.494 | 0.0187 | 54.1 | 19.5 |

Measurement results and calculation results about each of samples A and B are shown in Table 1. As shown in Table 1, sample A obtained in Example 1 had P50 of 0.474 µm, Pmax of 3.359 µm, P10 of 0.307 µm, and average thickness t of 0.0187 µm. Also, sample B obtained in Comparative Example 1 had P50 of 1.012 µm, Pmax of 9.629 µm, P10 of 0.494 µm, and average thickness t of 0.0187 µm. Furthermore, Table 1 shows values of P50/t and Pmax/P10 based on the obtained results.

Referring to Table 1, it was confirmed that the flaky aluminum pigment included in sample A obtained in Example 1 had P50 of less than 0.5 µm. Furthermore, it was confirmed that sample A in Example 1 had Pmax of 5.000 µm or less. Furthermore, it was found that sample A in Example 1 was smaller in value of Pmax/P10 and sharper in particle size distribution than sample B in Comparative Example 1.

<Characteristic Evaluation of Coating Film>

Samples A and B were used to produce a metallic composition A for evaluation and a metallic composition B for evaluation, which were then used to produce a coating film's characteristic evaluation film A and a coating film's characteristic evaluation film B by the method described below. Then, the characteristics of both coating films were evaluated by the method described below.

(Production of Characteristic Evaluation Film)

The metallic composition for evaluation and the coating film's characteristic evaluation film were produced as described below. First, after sample A obtained in the above-described Example 1 was weighed so as to set the amount of solid content of the flaky aluminum pigments at 1.0 parts by mass, sample A was diluted with 10 parts by mass of ethyl acetate, to which 4 parts by mass of pyroxylin lacquer (a mixture including 14 wt % of pyroxylin, with the rest made up of solvents such as toluene, ethyl acetate and alcohol, and additive components) was added, thereby preparing metallic composition A for evaluation. Similarly, sample B obtained in Comparative Example 1 was used to prepare metallic composition B for evaluation.

Then, an automatic coating apparatus (trade name: "PI-1210" manufactured by Tester Sangyo CO., LTD.) was used to apply metallic composition A for evaluation prepared as described above onto a PET film (using a bar coater #8, wet thickness: about 18.3 μm, speed 7), which was then naturally dried at a room temperature (25° C.) in the air for 1 hour. Consequently, coating film's characteristic evaluation film A was produced. Similarly, metallic composition B for evaluation prepared as described above was used to produce an evaluation film B. The obtained evaluation films A and B each had a metallic texture. In addition, since each flaky aluminum pigment included in the slurry in Comparative Example 1 had a relatively large particle size and therefore was difficult to be applied to an ink jet printer, each coating film was produced by an automatic coating apparatus in this case.

(Shielding Performance Evaluation 1)

The visible light transmittance of each of the produced evaluation films A and B was measured. The visible light transmittance was measured using a transmittance measurement apparatus (trade name: "Z-1001DP" manufactured by NIPPON DENSHOKU INDUSTRIES CO., LTD.). The smaller the value of the visible light transmittance is, the less the light is likely to be transmitted, which means that the shielding ability is relatively high. In addition, the transmittances were respectively calculated based on the transmittance of the PET film before forming a coating film defined as 100%, which were then compared for measurement.

(Shielding Performance Evaluation 2)

The shielding abilities of the produced evaluation films A and B were visually observed. Specifically, an upright-standing type artificial sunlight lamp (manufactured by SERIC., Ltd., main body XC-100 type, stand type, ST-1500C) was used to visually evaluate the light transmittance (shielding ability) of the coating film at 10 stages. In this case, 0 shows an uncoated PET film and 10 shows the state where light is completely shielded.

TABLE 2

| | Shielding Performance Evaluation 1 Transmittance (%) | Shielding Performance Evaluation 2 Shielding Ability |
|---|---|---|
| Example 1 | 6.8 | 5 |
| Comparative Example 1 | 7.2 | 4 |

The results of shielding performance evaluations 1 and 2 are shown in Table 2. As shown in Table 2, shielding performance evaluation 1 showed that evaluation film A was lower in transmittance than evaluation film B. Furthermore, shielding performance evaluation 2 showed that evaluation film A was higher in shielding ability than evaluation film B. Accordingly, it turned out that the flaky aluminum pigment in Example 1 can exhibit relatively high shielding performance.

Although the embodiments and examples according to the present invention have been described as above, the configurations of the embodiments and examples described above are intended to be combined as appropriate from the beginning.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

The invention claimed is:

1. A flaky metal pigment,
   said flaky metal pigment being made of aluminum, and
   in a case where said flaky metal pigment is measured by a flow-type particle image analyzer, P50 showing a 50% cumulative frequency of a diameter equivalent to an area circle in a number distribution being less than 0.500 μm,
   in the case where said flaky metal pigment is measured by the flow-type particle image analyzer, Pmax showing a maximum particle diameter of a diameter equivalent to an area circle in the number distribution being 5.000 μm or less,
   Pmax/P10 being 1 or more and 18 or less, wherein P10 is a value of a 10% cumulative frequency in the number distribution of the flaky metal pigments measured by the flow-type particle image analyzer.

2. The flaky metal pigment according to claim 1, wherein P50/t showing a ratio of an average thickness t of each said flaky metal pigment to said P50 is 3 or more and 100 or less.

3. A method of manufacturing a flaky metal pigment, said method comprising the steps of:
   preparing slurry including a flake made of metal; and
   fine-graining said flake by jetting said slurry at high pressure.

4. The method of manufacturing a flaky metal pigment according to claim 3, wherein
   said fine-graining step includes the steps of:
   jetting said slurry from a jetting unit into a reaction chamber at a pressure of 70 MPa or more; and
   causing said flake included in said jetted slurry to collide with a hard body disposed within said reaction chamber.

5. The method of manufacturing a flaky metal pigment according to claim 3, wherein
   said fine-graining step includes the steps of:
   jetting said slurry from a jetting unit into a reaction chamber at a pressure of 70 MPa or more; and
   causing said slurries jetted from said jetting unit to collide with each other to cause said flakes included in said slurries to collide with each other.

6. The method of manufacturing a flaky metal pigment according to claim 3, wherein said flake is made of aluminum obtained by a vacuum vapor deposition method.

7. A metallic composition including a flaky metal pigment according to claim 1.

8. A coated product comprising an object to be coated and a metallic composition according to claim 7 applied onto the object.

\* \* \* \* \*